United States Patent [19]

Thalmann et al.

[11] Patent Number: 4,825,543
[45] Date of Patent: May 2, 1989

[54] TOOL ASSEMBLY FOR CIRCUMFERENTIAL CUTTING OF CYLINDRICAL PIPE MEMBERS

[75] Inventors: Alfred Thalmann; Jürg Thalmann, both of Uhwiesen, Switzerland

[73] Assignee: Georg Fischer Aktiengesellschaft, Switzerland

[21] Appl. No.: 139,134

[22] Filed: Dec. 24, 1987

Related U.S. Application Data

[63] Continuation of Ser. No. 901,190, Aug. 28, 1986, abandoned.

[30] Foreign Application Priority Data

Apr. 7, 1986 [CH] Switzerland .......................... 1355/86

[51] Int. Cl.$^4$ .............................................. B23D 21/06
[52] U.S. Cl. ......................................... 30/96; 30/90.1; 82/113
[58] Field of Search ................. 269/157, 228; 30/90.1, 30/90.8, 90.9

[56] References Cited

U.S. PATENT DOCUMENTS

| | | | |
|---|---|---|---|
| 1,279,022 | 9/1918 | Scott | 30/96 |
| 1,691,763 | 11/1928 | Kastner | 30/95 |
| 2,155,705 | 4/1939 | Gottwald | 269/157 X |
| 2,448,578 | 9/1948 | Condon | 30/95 |
| 3,117,375 | 1/1964 | Meese | 30/96 |
| 3,869,791 | 3/1975 | Horrocks | 30/90.1 |
| 3,978,582 | 9/1976 | Maytham | 30/90.1 |
| 4,078,304 | 3/1978 | Netzel | 30/95 |
| 4,114,485 | 9/1978 | Coblitz et al. | 30/95 |
| 4,449,298 | 5/1984 | Putz | 30/90.1 |
| 4,575,061 | 3/1986 | Dille | 269/287 |

FOREIGN PATENT DOCUMENTS 0164986  6/1985  European Pat. Off. .

Primary Examiner—Frank T. Yost
Assistant Examiner—Eugenia A. Jones
Attorney, Agent, or Firm—Toren, McGeady

[57] ABSTRACT

A cutting tool assembly including a pair of articulated arcuate strap members adapted to be clamped about a cylindrical pipe for cutting about the circumference of the pipe. A guide mechanism is provided including a pair of roller members engaged about the periphery of the pipe member to be cut and a guide part on a cutting tool, which guide part cooperates with the roller members.

9 Claims, 2 Drawing Sheets

TOOL ASSEMBLY FOR CIRCUMFERENTIAL CUTTING OF CYLINDRICAL PIPE MEMBERS

This is a continuation of application Ser. No. 901,190 filed Aug. 28, 1986, now abandoned.

The present invention is directed generally to cutting tool assemblies and more specifically to a tool for effecting a cutting operation about the circumference of a cylindrical pipe member. The cutting tool of the invention is particularly adapted for cutting of plastic pipe members. In the treatment of plastic pipes which are to be utilized for a sleeve connection by means of welding or bonding or for welding of molded tapping pieces for branch lines, it is generally required to remove an uppermost layer from the outer surface of the pipe by a paring operation shortly before the welding or bonding process. Particularly, removal of an oxide layer, caused by ultraviolet light effects, shortly before the welding operation is quite important because such oxide layers give rise to disadvantageous influences on the quality of the welding operation.

For this purpose, there has been known in the prior art from EP-A2-0164986 a paring tool arranged to be rotatable about a bracket and adapted to be rotatably driven by means of a lever. A guide roller can be driven by means of the same lever through an exposed gear train, wherein a circumferential feed is generated. However, it has been found that this tool is only suited for machining of pipe ends having a length which is predetermined by the tool since it can be placed over the pipe end only in the axial direction. Furthermore, the tool is prone to malfunction when utilized in its normal environment at building sites having trenches because of the exposed gear train.

SUMMARY OF THE INVENTION

Accordingly, the present invention is directed toward providing a cutting tool assembly of the type previously discussed which is capable of effecting removal of an outer surface layer at ends of pipes of any length as well as at a portion of continuous piping intended for branch-off. The tool assembly of the invention is also suitable for utilization at building sites and permits simple and reliable handling.

Briefly, the invention may be described as a cutting tool assembly for effecting a cutting operation about the circumference of a cylindrical pipe member, particularly one made of plastic, the assembly comprising a pair of arcuate strap members arranged to extend circumferentially about the pipe member. The strap members are pivotally attached at their ends by an articulated joint and clamp means detachably connect the opposite ends of the strap members together. A spring urges the strap members into clamped engagement about the pipe members and a cutting tool is mounted on the assembly to effect a cutting operation on the circumference of the pipe member. The assembly includes guide means for providing a three-point support for the assembly on the pipe member. The guide means are composed of a pair of roller guides and of a part of the cutting tool which cooperates with the roller guides during operation of the assembly.

By designing the mounting of the assembly to consist of two straps which open out about an articulated joint, the tool may be introduced on a pipe member axially as well as radially. Particularly, the tool can be applied in the radial direction at any random point on a piping system due to its ability to be pivotally opened by rotating the strap members about the articulated joint so that they move radially of the pipe. With the tool of the present invention, it is possible to remove the outermost layer of the pipe by means of a paring process along any random length which is greater than the length of the cutting tool. Because of the elastic clamping of the two straps, out-of-round or slightly oval pipes can be pared with a uniform depth without jamming or without missing parts which are to be cut. A uniform paring process without formation of grooves in the longitudinal direction of the pipe will be assured by the advantageous pivotable arrangement of the cutting tool.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

DETAILED DESCRIPTION OF THE PREFERRED EMBODIMENT

Figure 1:
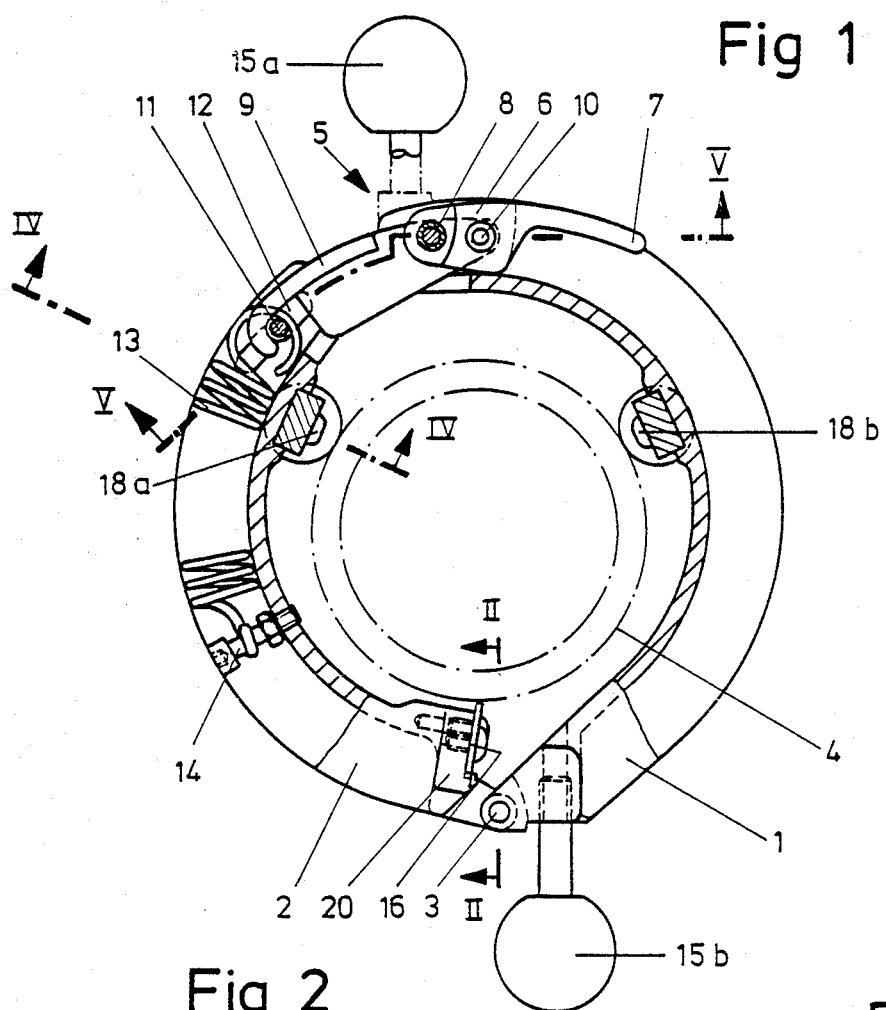
FIG. 1 is a side view partially in section of a tool in accordance with the present invention for paring upper surfaces of pipes.

Referring now to the drawings and more particularly to FIG. 1, the cutting tool assembly of the invention is shown as essentially comprising a pair of strap members 1 and 2 which are joined together at their ends at an articulated joint 3 so that they may be pivotable thereabout. The opposite ends of the strap member 1 and 2 may be clamped together by clamping means 5 which may comprise a bell crank-connection. It will be noted that the straps 1 and 2 are clamped about a pipe member 4 which is generally cylindrical in configuration and which is the member to be worked on. As will be noted from FIG. 1, the strap members 1 and 2 may be clamped about the pipe member 4 by being moved radially thereabout by pivoting about the articulation joint 3 and subsequent clamping by the bell-crank connection 5.

Figure 5:
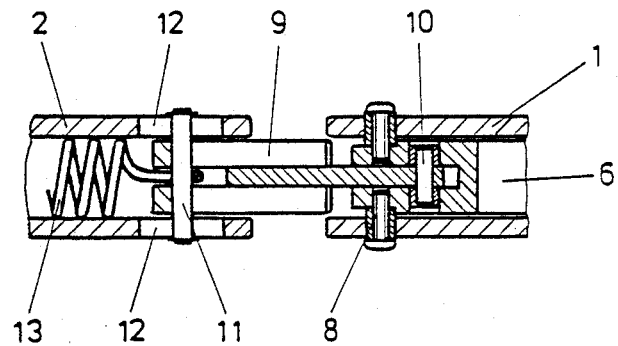
FIG. 5 is a sectional view taken along the line V—V of FIG. 1.

As may be discerned from FIGS. 1 and 5, the connecting means 5 comprises a first lever 6 which is arranged with one of its ends to be pivotable at the strap member 1 by means of an articulated joint 8 and which exhibits at its other end an actuating handle 7. A second lever 9 is pivotably fastened with one of its ends at the first lever 6 by means of an articulated joint 10 and it can be coupled at its other end with a bolt 11 of the other strap 2.

The bolt 11 is displaceably supported in slits 12 formed in the strap member 2 extending along the contour or tangentially to the contour of the strap 2 with a tensile spring 13 being hooked on the bolt 11. The other end of the spring 13 is hooked at a screw or bolt member 14 which is rigidly connected with the strap member 2.

By closing the lever 6 beyond a dead point of the articulated joint 10, the closed position of the cutting tool assembly becomes self-locking against the force of the spring 13.

Figure 2:
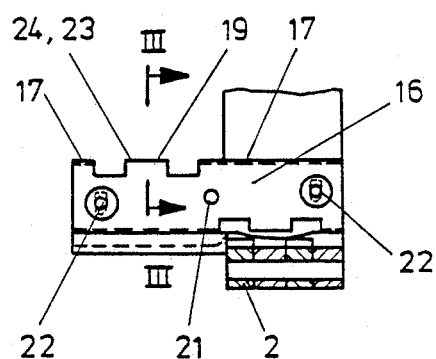
FIG. 2 is a sectional view taken along the lines II—II of FIG. 1.

The assembly also includes a cutting or paring tool 16 which is arranged at the strap member 2, as will be seen from FIGS. 1 and 2. The cutter or cutting tool 16 is formed to include guide portions 17 which, together with a pair of roller guides 18a and 18b, constitute guide means for the cutting tool assembly. The guide means operate to provide a three-point contact about the pipe member 4, as will be evident from FIG. 1.

After closing of the connecting means 5 with the roller guides 18a and 18b and the guide portions 17, the cutting tool will be held by the force of the tensile spring 13 on the pipe member 4 adapted to the dimensions and the shape of the pipe member and so as to be rotatable thereon.

Guide portions 17 are arranged on both sides of an axially extending cutting edge 19, as viewed in the axial direction of the pipe member 4. The guide portions 17 are preferably longitudinal edges formed by two surfaces intersecting at an obtuse angle.

The cutting tool 16 is arranged at a contact web 20 of the strap 2 so as to be pivotable about a pin 21 and it may be easily replaced by means of screws 22. The cutting edge 19 is located to lie axially outside the area of the strap 2 extending along its contour, thus causing the cutting edge 19 to be easily visible during a machining operation and to be easily adjustable in the radial direction of the pipe outer surface because of the pivotability of the cutting tool 16.

The tool 16 is designed as a reversible cutting tool having guide faces and a cutting edge arranged at an opposite side. The cutting edge 19 comprises fine serration-shaped grooves 23 which assure a satisfactory cutting operation or chip formation operation.

Figure 3:
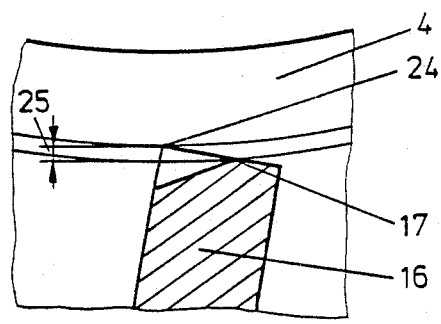
FIG. 3 is a partial longitudinal section taken along the line III—III of FIG. 2 showing the device in a magnified view.

As will be discerned from FIG. 3, a radially extending spacing 25 which determines the chip depth is provided between the guide portions 17 and the cutting edge 24 and, by means of this, a chip formation paring the upper surface is achieved which remains constant in contour and longitudinal direction of the pipe. The cutting tool 16 is arranged with one roller guide 18a on one strap 2 and the other roller guide 18b on the other strap 1, wherein, in the clamped state of the cutter assembly, centering of the three contact points of the pipe is assured along the contour or circumference thereof.

Figure 4:
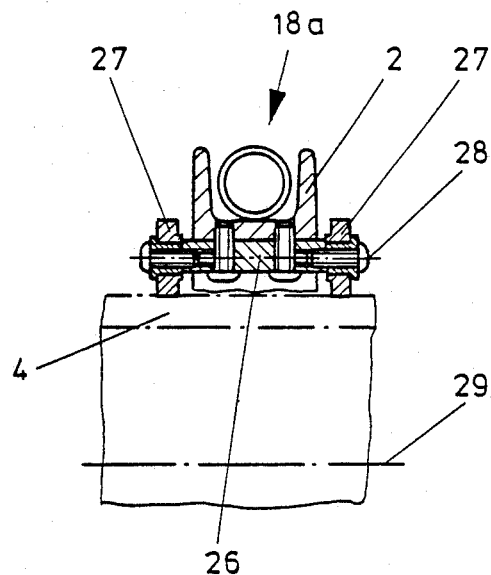
FIG. 4 is a sectional view taken along the line IV—IV of FIG. 1.

Each roller guide 18a, 18b comprises, as will be seen from FIG. 4, two rollers 27 fastened at a mounting 26 on both sides of the strap 1 or 2, whose common axis of rotation 28 is arranged to extend slightly inclined with respect to the pipe axis 29. The rollers 27 are provided with a knurling at their outer circumference which increases the frictional resistance between the roller and the pipe. This assures, in connection with the inclined position of the roller rotational axis 28, an axial feed of the tool during rotational movement.

A pair of knobs or handles 15a and 15b aligned approximately opposite each other are fastened at the sides of the strap 1 which does not carry the cutting tool 16. These handles are arranged on that side of the tool where the cutting edge 19 of the cutting tool 16 is located. In the case of larger tool dimensions, it is possible to arrange more than two handles at the side or at the center of one strap member.

By means of a special arrangement of the handles 15a and 15b at the strap member 1, rotational movement of the tool, and, thus, a cutting operation may be effected with uniform force transmission. This may be performed manually using both hands of the operator, whereby the spring 13 acts as an equalizing element. The opening and closing of the strap members 1 and 2 may also be accomplished manually, thus assuring a simple and easy handling of the tool assembly.

It will accordingly be seen that the present invention provides a particularly advantageous cutting tool assembly comprising a pair of strap members 1 and 2 which may be clamped with each other against the force of the tensile spring 13 by means of the bell-crank connection 5, with the assembly comprising roller guides 18a and 18b and a cutter 16 provided with guide portions 17. By rotation of the tool by means of the two handles 15a and 15b, a uniform paring with a predetermined chip depth of the pipe outer surface may be achieved at any random location on the pipe.

The invention is particularly adapted for use with plastic pipe members and it will be noted that the guide means of the invention including the roller guides 18a and 18b operate to provide a three-point support for the assembly on the pipe member 4, which support includes the guide portions 17 formed on the cutting tool 16 which cooperate with the roller guides 18a and 18b in forming the guide means of the invention.

While a specific embodiment of the invention has been shown and described in detail to illustrate the application of the inventive principles, it will be understood that the invention may be embodied otherwise without departing from such principles.

What is claimed is:

1. A cutting tool assembly for effecting a cutting operation about the circumference of a cylindrical pipe member having an axis, particularly one made of plastic material, comprising:
   a pair of arcuate strap members arranged to extend circumferentially about said pipe member;
   an articulated joint pivotally attaching said strap members with each other at first ends thereof;
   clamp means detachably connecting said strap members together at ends thereof opposite said first ends;
   spring means urging said strap members into clamped engagement about said pipe member;
   a cutting tool mounted on said assembly to effect peeling of an outer surface layer from an outer circumference of said pipe member;
   guide means providing a three-point support for said assembly on said pipe member, said guide means including a pair of roller guides and a guide portion on said cutting tool cooperating with said roller guides for rotation of said assembly about said axis and around the circumference of said pipe member;
   said cutting tool including an axially extending cutting edge extending substantially parallel to said axis with said guide portion being spaced radially with respect to said cutting edge and transverse to said axis by a distance determining the cutting depth of said cutting edge into said outer circumference of said pipe member; and
   mounting means for pivotally supporting said cutting tool about a fulcrum on one of said strap members so as to be easily replaceable and so that said cutting edge can be moved radially at the surface of said pipe member, said mounting means carrying said cutting tool in a position with said cutting edge spaced axially outside the area of said strap members and away from said fulcrum.

2. An assembly according to claim 1, wherein said guide portion includes a pair of guide parts with said guide parts, when viewed in the radial direction of said tool assembly, being arranged on both sides of said cutting edge.

3. An assembly according to claim 1, wherein said cutting tool and one of said pair of roller guides are arranged on one of said strap members and wherein the other of said roller guides is arranged at the other of said strap members.

4. An assembly according to claim 1, wherein said clamp means comprise a bell-crank connection including lever means for connecting said spring means to one of said opposite ends, said spring means being connected to said strap member having the other of said opposite ends.

5. An assembly according to claim 1, wherein said pipe member has a central pipe axis and wherein said pair of roller guides are arranged for rotation about a rotational axis extending at an acute angle with respect to said pipe central axis.

6. An assembly according to claim 1, wherein said cutting tool comprises a cutting edge having fine serration-shaped grooves.

7. An assembly according to claim 1, wherein said cutting tool is mounted on one of said strap members and wherein at least two handles for rotating said cutting tool assembly are arranged at the other of said strap members.

8. A cutting tool assembly for effecting a cutting operation about the circumference of a cylindrical pipe member, particularly one made of plastic material, comprising:

a pair of arcuate strap members arranged to extend circumferentially about said pipe member;

an articulated joint pivotally attaching said strap members with each other at first ends thereof;

clamp means detachably connecting said strap members together at ends thereof opposite said first ends;

spring means urging said strap members into clamped engagement about said pipe member;

a cutting tool mounted on said assembly to effect peeling of an outer surface layer from an outer circumference of said pipe member; and guide means providing a three-point support for said assembly on said pipe member, said guide means including a pair of roller guides and a guide portion on said cutting tool cooperating with said roller guides;

said clamp means comprising a bell-crank connection including lever means;

a first lever arranged with one end thereof at one of said strap members in an articulated manner and exhibiting at the other end thereof an actuating handle and a second lever arranged with one end articulated at said first lever and with another end hookable at a bolt on the other of said strap members.

9. An assembly according to claim 8, wherein said bolt is arranged at said other strap member so as to be displaceable circumferentially of said pipe member against the force of said spring means, said spring means being connected with said bolt.

* * * * *